(12) United States Patent
Meier et al.

(10) Patent No.: US 8,096,699 B2
(45) Date of Patent: Jan. 17, 2012

(54) DOUGH PROCESSING MACHINE

(75) Inventors: Alexander Meier, Dürrwangen (DE);
Christian Habermann, Burk (DE)

(73) Assignee: Werner & Pfleiderer Lebensmitteltechnik GmbH, Dinkelsbuhl (DE)

( * ) Notice: Subject to any disclaimer, the term of this patent is extended or adjusted under 35 U.S.C. 154(b) by 597 days.

(21) Appl. No.: 12/340,946

(22) Filed: Dec. 22, 2008

(65) Prior Publication Data

US 2009/0161477 A1    Jun. 25, 2009

(30) Foreign Application Priority Data

Dec. 22, 2007 (DE) .......................... 10 2007 062 386

(51) Int. Cl.
*A21C 1/00* (2006.01)
(52) U.S. Cl. .................. 366/69; 366/76.7; 366/76.93
(58) Field of Classification Search .................. 366/69, 366/76.7, 76.93
See application file for complete search history.

(56) References Cited

U.S. PATENT DOCUMENTS

| | | | | |
|---|---|---|---|---|
| 1,423,371 A | * | 7/1922 | Vierow | 425/239 |
| 3,125,039 A | * | 3/1964 | Haug et al. | 425/240 |
| 4,211,492 A | * | 7/1980 | Konig et al. | 366/76.5 |
| 5,441,342 A | * | 8/1995 | Konig et al. | 366/76.7 |
| 5,775,804 A | * | 7/1998 | Meier | 366/76.8 |
| 5,897,203 A | * | 4/1999 | Kock | 366/76.1 |

FOREIGN PATENT DOCUMENTS

| | | |
|---|---|---|
| DE | 10249496 A1 | 5/2004 |
| DE | 10306438 A1 | 8/2004 |
| EP | 0494367 A1 | 7/1992 |
| WO | 03022057 A2 | 3/2003 |

* cited by examiner

*Primary Examiner* — Joseph Del Sole
*Assistant Examiner* — James Sanders
(74) *Attorney, Agent, or Firm* — Browdy and Neimark, PLLC

(57) ABSTRACT

A dough processing device has a support frame, a dough feed device, a dough portioning device, a dough kneading device and a dough transfer device. The latter transfers at least one dough portion from at least one portioning chamber of the dough portioning device to at least one kneading chamber of the dough kneading device during transfer time periods. An adjustment device serves for defining a vertical distance between the transfer device and the kneading chamber. This results in a dough processing machine in which a reliable transfer of dough portions from the at least one portioning chamber to the at least one kneading chamber is ensured even in the case of a high throughput.

15 Claims, 7 Drawing Sheets

DOUGH PROCESSING MACHINE

BACKGROUND OF THE INVENTION

1. Field of the Invention

The invention relates to a dough processing machine comprising
- a support frame;
- a dough feed device;
- a dough portioning device;
- a dough kneading device; and
- a dough transfer device which transfers at least one dough portion from at least one portioning chamber of the dough portioning device to at least one kneading chamber of the dough kneading device during transfer time periods.

2. Background Art

A dough processing machine of this type is disclosed in DE 102 49 496 A1. This known dough processing machine is still in need of improvement in terms of the transfer reliability from a portioning chamber of the dough portioning device to a kneading chamber of the dough kneading device during operation of the dough processing machine, in particular if a high throughput of the dough processing machine is required.

WO 03/022057 A2 discloses a dough processing machine comprising a displaceable cylinder, wherein a vertical displacement thereof permits one to alternate between a larger and a smaller measuring piston of a portioning device of the dough processing machine.

It is an object of the present invention to improve a dough processing machine of the type named at the outset in such a way that a reliable transfer of dough portions from the at least one portioning chamber to the at least one kneading chamber is ensured even in the case of a high throughput.

SUMMARY OF THE INVENTION

This object is achieved according to the invention by a dough processing machine comprising
- a support frame;
- a dough feed device;
- a dough portioning device;
- a dough kneading device; and
- a dough transfer device which transfers at least one dough portion from at least one portioning chamber of the dough portioning device to at least one kneading chamber of the dough kneading device during transfer time periods;

wherein the dough transfer device is designed such that in a transfer position of the portioning chamber, the dough portion detaches from a discharge piston and falls into the associated kneading chamber, wherein an adjustment device is provided for defining a vertical distance between the transfer device and the kneading chamber.

In accordance with the invention, it has been found that a distance adjustment device enables a transfer path from the at least one portioning chamber to the at least one kneading chamber to be adapted to operating conditions of the dough processing machine, in particular to the type of dough, the amount of dough or the dough density, in such a way that an optimum dough portion transfer is guaranteed in dependence on the prevalent operating conditions. Adapting the vertical distance makes it possible to achieve a targeted fall path of the dough portion from the discharge piston into the associated kneading chamber. This ensures a fast and at the same time reliable transfer, and therefore a high throughput of the dough processing machine. The vertical distance may be set by adjusting the distance between the transfer device and the kneading chamber along a vertical directional component. This adjustment need not be performed in a strictly vertical direction. The adjusting movement of the adjustment device for setting the vertical distance may in particular also be guided in a diagonal direction or along a parabolic curve. This enables the position of the kneading chamber relative to the transfer device to be adjusted along a fall path of the dough portion.

An adjustment device that is designed in such a way as to allow a horizontal distance to be additionally defined between the transfer device and the kneading chamber further improves the relative positioning, which is adapted to the respective operating conditions, of the at least one portioning chamber relative to the at least one kneading chamber. Horizontal or lateral momenta acting on the dough portion to be transferred may be taken into account when setting the horizontal or lateral distance by means of the adjustment device.

Depending on the design of the dough processing machine, a displacement of the dough kneading device with a vertical directional component by means of a displacement drive of the adjustment device, or a displacement of the dough portioning device with a vertical directional component by means of a displacement drive of the adjustment device may be more advantageous. It is of course conceivable as well to design both the dough kneading device and the dough portioning device in an adjustable manner according to the invention. The displacement drive may be manual or motorized.

An adjustment device that is connected to a drive motor which is in a signal connection with a control unit enables the distance between the at least one portioning chamber and the at least one kneading chamber to be defined in an automatically controlled manner, depending on the operating data of the dough processing machine, in particular depending on an amount of dough or a type of dough.

A signal connection between the control unit and a drive component of a drive of the dough kneading device permits a controlled transfer of dough portions from the portioning chamber to the kneading chamber by means of a synchronized relative movement of the portioning device and the kneading device receiving the dough portions from the portioning device. This may further improve the transfer reliability.

A spindle-type lifting gear of the displacement drive results in an accurate adjustment by means of the adjustment drive. The spindle-type lifting gear may in particular be designed as a self-locking spindle-type lifting gear. Alternatively or in addition thereto, the dough portioning device and/or the dough kneading device may also be locked in the respective adjustment position. This protects respective supports of the adjustment device against harmful effects of vibrations of the dough portioning device and/or the dough kneading device.

A guide means of the adjustment drive for guiding a displacement movement of at least one of the group comprising the dough kneading device and the dough portioning device relative to the support frame ensures an accurate adjustment by means of the adjustment device.

A dough kneading device in the form of a kneading drum enables a plurality of dough portions to be kneaded in particular simultaneously. The kneading drum may be designed as described in DE 102 49 496 A1 or in DE 103 06 438 A1.

A design of the guide means, wherein the guide means is on both sides mounted on stub axles of the kneading drum, and wherein one of the spindly-type lifting gears is assigned to each partial guide means which is in each case assigned to one stub axle, is safe to operate in particular when a heavy kneading drum is used.

This applies in particular to a guide means that comprises two linear guides which are in particular designed as recirculating ball bearing guides.

A design according of a dough processing machine, wherein the adjustment device is designed such that at least a drive component of the displaced component remains in place when at least one of group comprising the dough kneading device and the dough portioning device is displaced, reduces the weight load, in particular of guide elements of the adjustment device. The potentially heavy drive component remains in place and need not be displaced.

A belt-length compensation device of a belt drive, which is a drive component for the dough kneading device, provides for a kneading drum adjustment while simultaneously maintaining a constant tension of the kneading belt. Belt-length compensation may take place by means of a spring bias or alternatively by means of a pneumatic drive.

An embodiment of the invention will hereinafter be described in more detail by means of the drawings.

DESCRIPTION OF THE PREFERRED EMBODIMENTS

Figure 1:
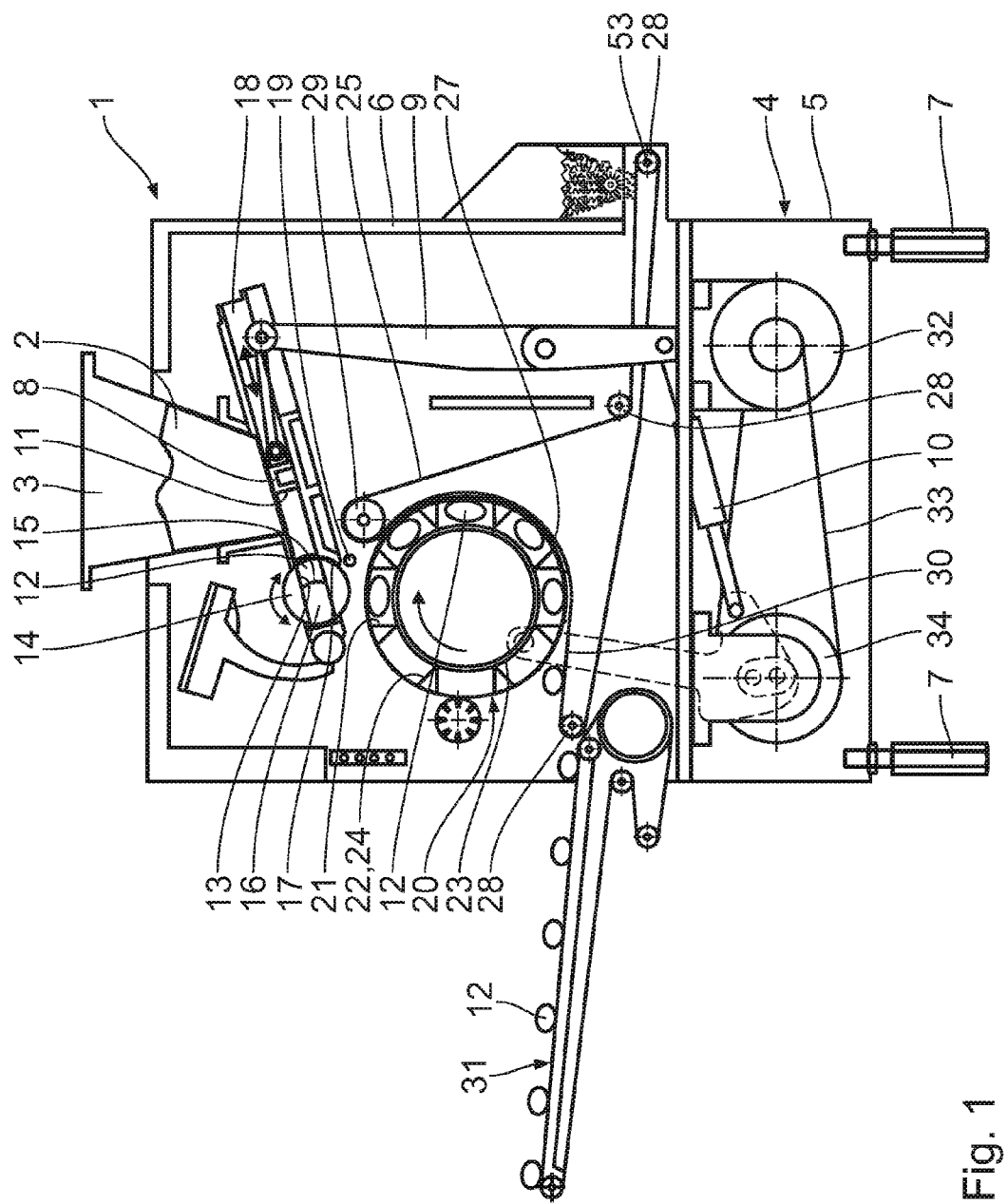
FIG. 1 shows a schematic side view of a dough processing machine revealing inner details thereof.
Figure 2:
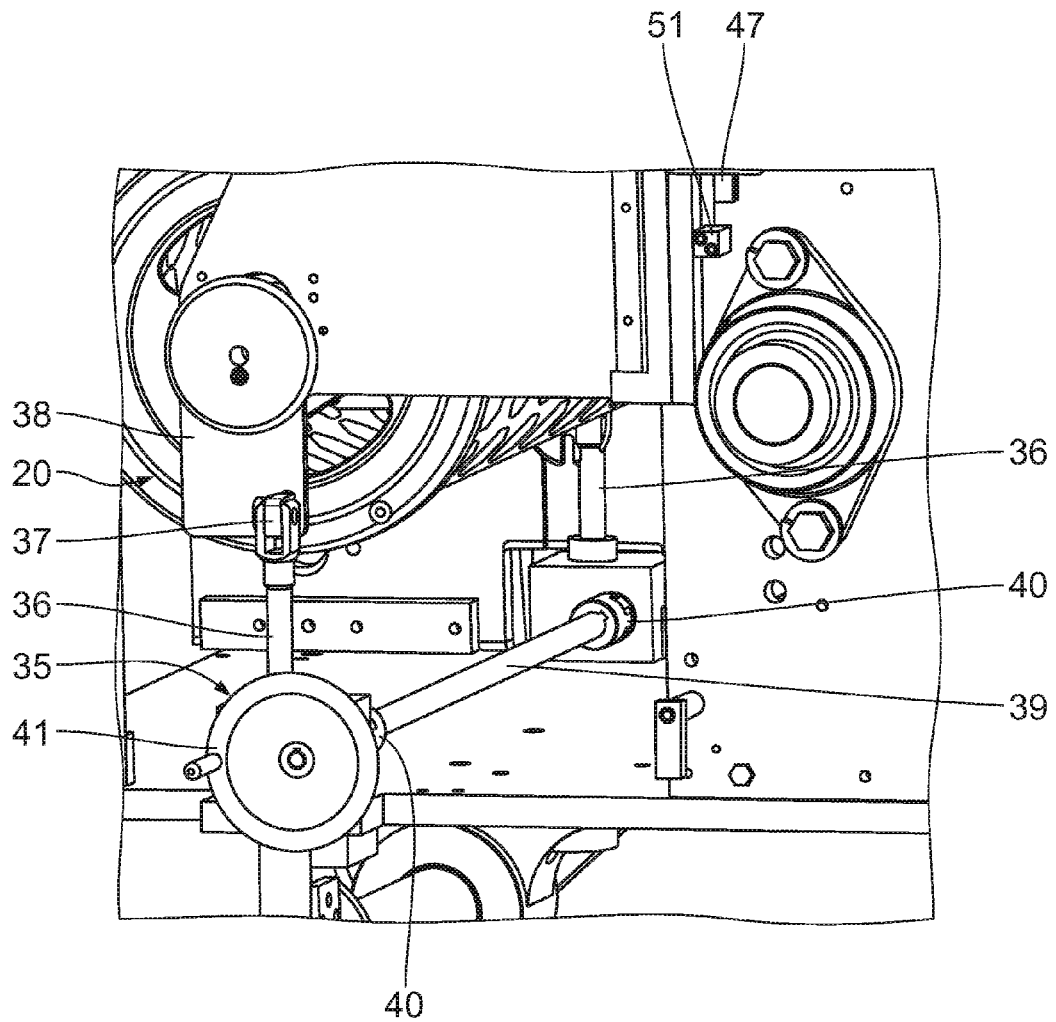
FIG. 2 shows a section of components of a lift adjustment device of a kneading device of the dough processing machine according to FIG. 1.
Figure 3:
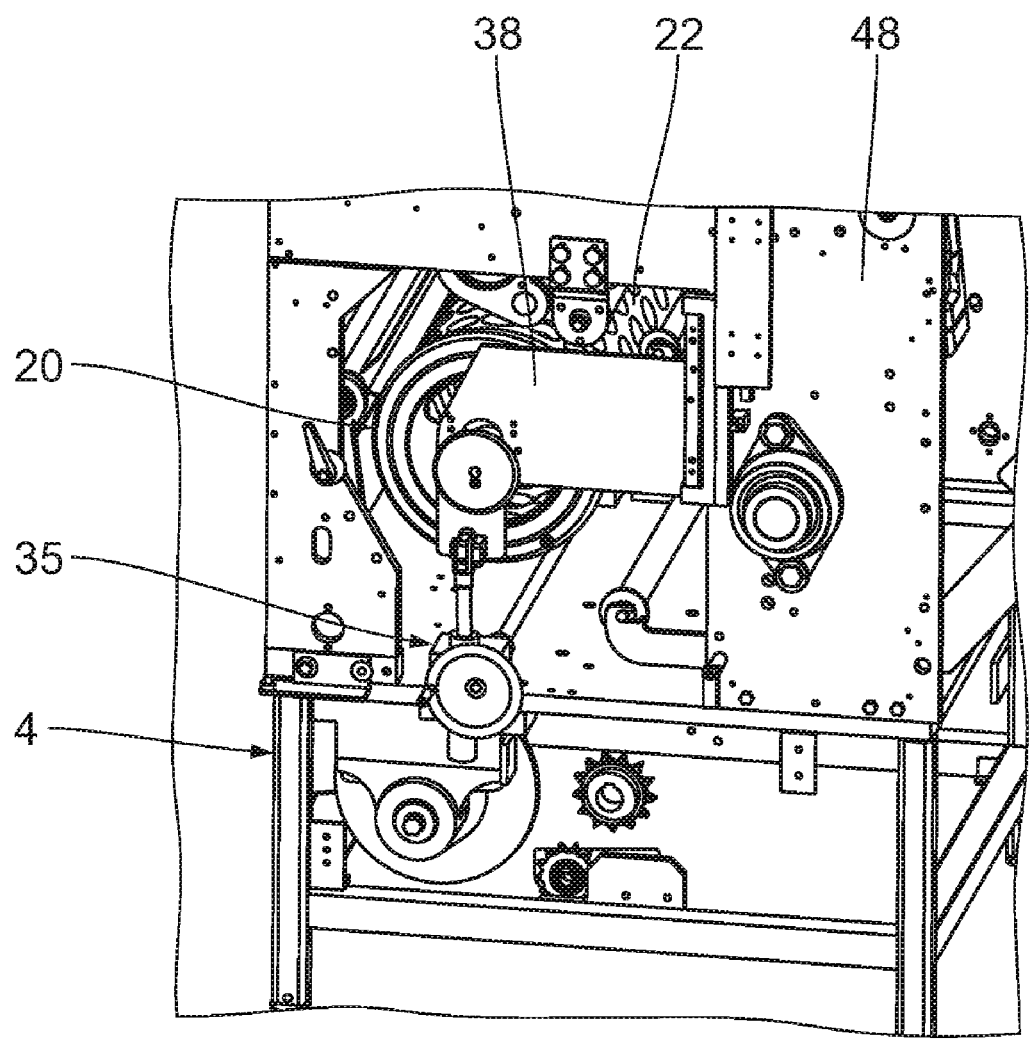
FIG. 3 shows a perspective sectional view of the dough processing machine which is shown in more detail than in FIG. 1 and from a direction similar to that in FIG. 2.
Figure 4:
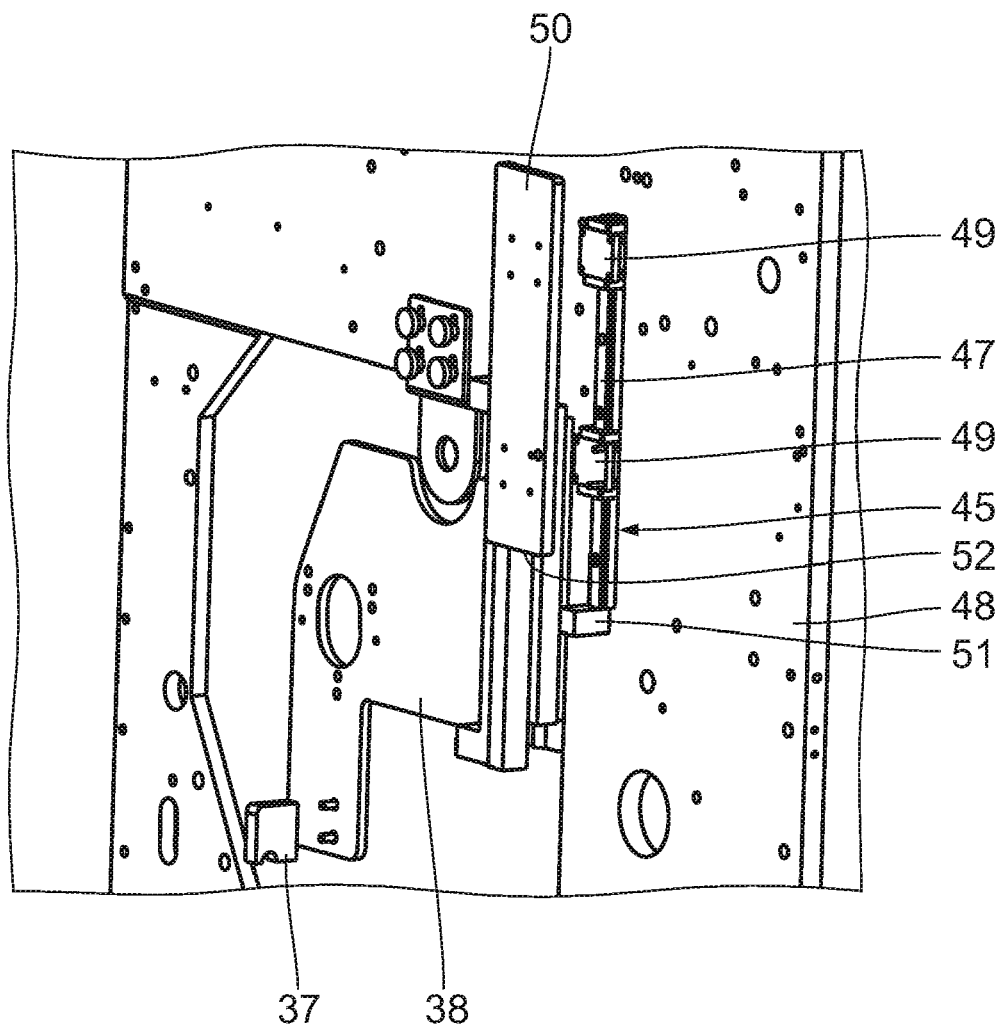
FIG. 4 shows an exploded view of details of a linear guide means of the lift adjustment device of the dough processing machine.

A dough processing machine 1 serves for portioning and kneading dough, for instance when making bread rolls. Dough 2 is filled in a feed hopper 3. The feed hopper 3, as well as the other components of the dough processing machine 1, is supported by a support frame 4 which is divided into a drive frame 5 and a frame structure 6. The drive frame 5 is drivable by way of rollers 7.

A discharge opening at the bottom of the feed hopper 3 is in connection with a delivery chamber in which a delivery piston 8 runs substantially horizontally. The delivery piston 8 and the feed hopper 3 are parts of a dough feed device of the dough processing machine 1. A delivery movement of the delivery piston 8 is actuated by a crank drive 9 which may for instance be mechanically designed such as described in EP 0 494 367 A1, for example, and is therefore not explained in detail. The crank drive 9 is actuated by a hydraulic cylinder 10.

A bottom 11 near the front of the delivery piston 8 forms a boundary wall of a transfer chamber for a portioned dough piece 12. A portioning chamber 13, which is on three sides delimited by two blades of a rotary vane 14 and by a discharge wall 15 (cf. FIG. 7) of a discharge piston 16, forms a part of the transfer chamber. The rotary vane 14 and the discharge piston 16 together form a part of a dough portioning device of the dough processing machine 1. Furthermore, the rotary vane 14 and the discharge piston 16 together form a transfer device of the dough processing machine 1, the transfer device transferring a dough portion, in other words the portioned dough piece 12, from the portioning chamber 13 to the kneading chamber 21 during transfer time periods. A conventional crank drive, which is not explained in more detail, enables the rotary vane 14 and the discharge piston 16 to be actuated synchronously with the delivery movement of the delivery piston 8. An outer peripheral wall of the rotary vane 14 slides on a guide wall 17 which is formed in a support body 18 at the bottom of the delivery piston 8.

A discharge roller 19 is arranged below the support body 18 next to the guide wall 17.

The crank drive for the rotary vane 14 is part of a transfer device for transferring the portioned dough pieces 12 from the delivery chamber at the bottom end of the feed hopper 3 to a kneading drum 20 which forms a dough kneading device of the dough processing machine 1. A transfer takes place from the portioning chamber 13 of the dough portioning device to a kneading chamber or kneading cell 21 of the kneading drum 20, the kneading cell 21 being in a transfer position.

The kneading drum 20 is arranged below the rotary vane 14 and comprises a hollow-cylindrical chamber drum 22, which is provided with through-holes in the usual manner, and an inner kneading wall 23 arranged coaxially thereto. Parallel to the longitudinal axis of the chamber drum 22, kneading-cell boundary webs 24 are equally distributed in the peripheral direction of the chamber drum 22, the kneading-cell boundary webs 24 having a triangular cross-section which widens from the inner kneading wall 23 towards the outer surface of the chamber drum 22.

The kneading cells 21, which receive in each case one dough piece 12, are defined by in each case two adjacent kneading-cell boundary webs 24 together with the intermediate sections of the inner kneading wall 23 and a kneading belt 25 which bears against the outside of the chamber drum 22 via a peripheral section. The kneading drum 20 has a total of several tens of such kneading chambers 21. In the embodiment according to FIG. 1, there are eight kneading chambers 21 when seen in the peripheral direction. Perpendicular to the drawing plane of FIG. 1, there are approximately eight more of such kneading chambers 21 which are arranged in succession so that the kneading drum 20 may for instance be provided with 64 kneading chambers 21.

Figure 5:
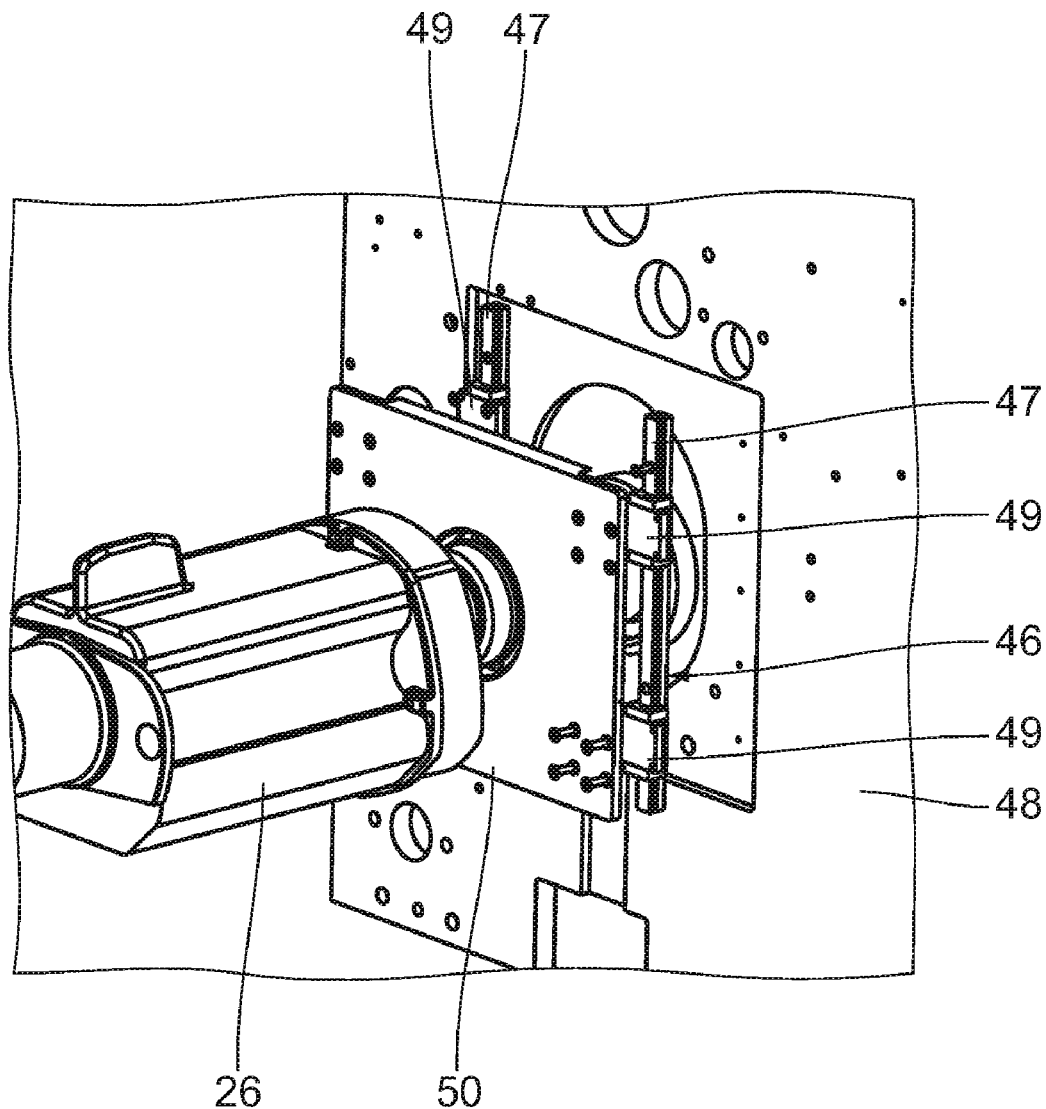
FIG. 5 shows an exploded view of details of the lift adjustment device in the region of components of the linear guide means which are assigned to an inner kneading device drive.
Figure 6:
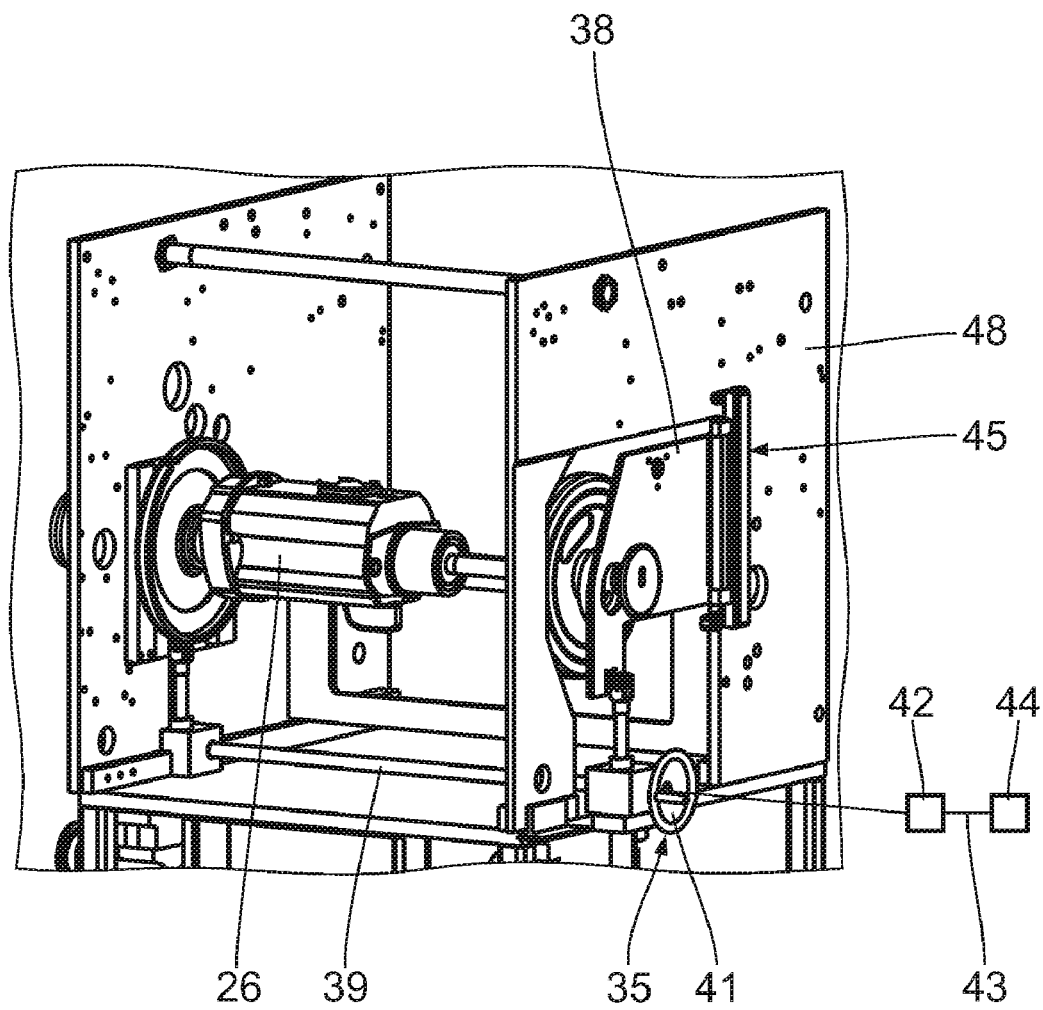
FIG. 6 shows a perspective view of assemblies of the dough kneading device together with the lift adjustment device and the linear guide means.

A drive of the kneading drum 20 may for instance be designed as described in DE 103 06 438 A1. A drive motor 26 is arranged next to one of the two stub axles of a kneading drum axle which extends along the longitudinal kneading drum axis (cf. FIGS. 5 and 6).

The chamber drum 22 is in contact with a kneading-belt conveying part 27 of the kneading belt 25. The kneading belt 25 is an endless belt which is guided to the kneading belt drive via three deflection rollers 28, the chamber drum 22 and via a belt drive roller 29. Seen in the peripheral direction of the kneading belt 25, the kneading-belt conveying part 27 turns into a discharge conveying part 30 for discharging the kneaded dough pieces 12 from the kneading chambers 21. Seen in the delivery direction, a dough discharge device 31 is arranged next to an end portion of the discharge conveying part 30, the dough discharge device 31 having an endless, revolving conveyor belt for discharging the kneaded dough pieces 12. Actuation of the rotary vane 14, the discharge roller 19, the belt drive roller 29 and the dough discharge device 31 may be derived from a main drive 32 of the dough processing machine, the main drive 32 actuating an eccentric wheel 34 via a toothed belt 33.

A vertical distance A between the transfer device 14 and the kneading chamber 21 may be adjusted by means of a lift adjustment device 35 which will hereinafter be described in more detail by means of FIGS. 2 to 6.

The lift adjustment device 35 has two spindle-type lifting gears 36 which are in a lifting connection with one of the stub axles of the kneading drum 20 by means of in each case one lifting element 37 (also cf. FIG. 4) and in each case one connection plate 38. The spindle-type lifting gears 36 are in particular self-locking spindle-type lifting gears. The two spindle-type lifting gears 36 are actively connected to one another by way of a connection shaft 39. A force-transmitting connection coupling is in each case arranged between the two ends of the connection shaft 39 and the two spindle-type lifting gears 36. The connection shaft 39, and thus the spindle-type lifting gears 36, are actuated via a hand wheel 41. In an alternative embodiment of the dough processing machine 1, as it is indicated schematically in FIG. 6, a drive motor 42 for actuating the connection shaft 39, and thus the lift adjustment device 35, may be provided as an alternative or in addition to the actuation via the hand wheel 41. In this alternative embodiment, the drive motor 42 is in a mechanical operative connection with the connection shaft 39, as it is indicated by dashed lines in FIG. 6. Via a signal line 43, the drive motor 42 is in a signal connection with a control unit 44 which may be a central control unit of the dough processing device 1. The control unit 44 may be in a signal connection with at least another drive component, for instance one of the drive motors of the kneading drum 20, via a signal connection which is not shown in the drawing.

A lift-adjusting movement, which may be generated by the lift adjustment device 35, is provided by two linear guide means 45, 46 which are in each case assigned to the two spindle-type lifting gears 36. The linear guide means 45, 46 are in particular designed as recirculating ball bearing guides. One of these two linear guide means, namely the linear guide means 45, is shown in an exploded view in FIG. 4, the other one of the two linear guide means, namely the linear guide means 46 which is adjacent to the drive motor 26, is shown in an exploded view in FIG. 5.

The linear guide means 45 has a vertically extending guide rod 47 which is screwed to a support plate 48 of the support frame 4 by means of cylinder head screws. The guide rod 47 is a profiled rod with a dovetail guide profile. An inner cross-section of two guide blocks 49 is formed complementary to this cross-section so that the two guide blocks 49 are able to run on the guide rod 47 with a minimum clearance along the guide rod 47. The two guide blocks 49 are screwed to a guide plate 50 by in each case four screws, the guide plate 50 in turn being rigidly connected to the connection plate 38.

At the lower end of the guide rod 47, a stop body 51 is screwed to the support plate 48, the stop body 51 interacting with a lower front wall 52 of the guide plate 50 acting as a counter body. Components of the second linear guide means 46 which correspond to those of the first linear guide means 45 already described above, are hereinafter denoted by the same reference numerals and are not discussed in detail again.

The linear guide means 46 comprises a total of two guide rods 47 which extend vertically as well. The two guide rods 47 are in turn screwed to a support plate 48 of the support frame 4. Each of these two guide rods 47 has two guide blocks 49 which run along the respective guide rod 47 and of which three guide blocks 49 are visible in FIG. 5. Screwed to the total of four guide blocks 49 is a guide plate 50 which is connected to the drive motor 26 in a supporting manner.

During a height adjustment of the kneading drum 20 in order to change the distance A, the belt drive roller 29 is not displaced but remains in its relative position relative to the support frame 4. The dough processing machine 1 therefore comprises a belt-length compensation device which provides the necessary length compensation for the kneading belt 25 when the kneading drum 20 is vertically adjusted. The belt-length compensation device may be a resilient mounting 53 of the deflection roller 28 shown on the right of FIG. 1.

The dough processing machine 1 works as follows: dough 2, which is supplied to the dough processing machine 1 via the feed hopper 3, enters the delivery chamber at the bottom of the feed hopper 3 when the delivery piston 8 is retracted towards the right of the drawing. The delivery piston 8 actuated by the crank drive 9 so as to be guided in the direction of the rotary vane 14 which is oriented as shown in FIG. 1. This causes the dough 2 in the delivery chamber to be compressed between the bottom 11 of the delivery piston 8 and the discharge piston 16 of the rotary vane 14. At the end of the delivery movement of the delivery piston 8 towards the rotary vane 14, the latter is in a position in which the bottom 11 is relatively close to the peripheral wall of the rotary vane 14. The compressed dough 2 is then located in the transfer chamber between the delivery piston 8 and the discharge piston 16. Afterwards, the rotary vane 14 rotates in the clockwise direction, wherein during this rotary movement, the portioning chamber 13 is initially confined between the walls of the two blades of the rotary vane 14, the discharge wall of the discharge piston 16 and the guide wall 17 of the support body 18. When the rotary vane 14 continues to rotate, the portioning chamber 13 reaches a position which is approximately opposite to an uppermost of the kneading chambers 21 of the kneading drum 20. In this transfer position of the portioning chamber 13 relative to the kneading chamber 21, the discharge roller 19 is activated and causes the dough piece 12 to detach from discharge piston 16 so as to fall into the associated kneading chamber 21. The precise transfer position of the portioning chamber 13 relative to the associated kneading chamber 21, which ensures a targeted transfer of the dough piece 12 both in the vertical and in the horizontal direction according to FIG. 1, depends on various parameters. These include the type of dough, the amount of dough, the dough density and the relative sizes of the portioning chamber 13 relative to the kneading chamber 20. If the dough piece 12 consists of a larger amount of dough, a for instance larger distance A between the portioning chamber 13 and the associated kneading chamber 21 may help to achieve a reliable transfer. Furthermore, particular dough consistencies may require the associated kneading chamber 21 to be offset horizontally by a certain amount relative to the portioning chamber 13 so as to ensure a reliable transfer of the dough piece 12. Depending on the above-mentioned dough parameters, a particular distance A is set via the lift adjustment device 35. This may be performed manually via the hand wheel 41 or in a controlled manner via the control unit 44 if the drive motor 42 is provided. In addition to that, a desired horizontal or lateral offset of the associated kneading chamber 21 relative to the portioning chamber 13 may be set by actuating the rotary drive of the chamber drum 22. In contrast to what is shown in FIG. 1, the kneading chamber 21 can then not be arranged precisely below the rotary vane 14 but is slightly offset relative to this position when seen in the direction of rotation 54 or opposite to this direction of rotation 54. The optimum adjustment of the distance A as well as the optimum adjustment of the horizontal distance, which were in each case determined by preliminary tests, may be stored in a table in the control unit 44 so as to be retrieved automatically in dependence on the dough parameters, thus ensuring an automatic setting of an optimum transfer position of the portioning chamber 13 relative to the associated kneading chamber 21 by means of the lift adjustment device 35 and, if necessary, by means of the drive which is assigned to the chamber drum 22.

As soon as the dough piece 12 has been safely transferred to the kneading chamber 21, the chamber drum 22 rotates in the direction of rotation 54 such that, the kneading chambers 21 are closed towards the outside by the kneading belt 25 during the kneading action of the kneading chamber 20. Subsequently, the kneading drum 20 performs a relative movement of the rotating chamber drum 22 relative to the inner kneading wall 23 on the one hand and relative to the kneading belt 25 on the other such that the dough pieces 12, which are located in the kneading chambers 21 between the inner kneading wall 23 and the kneading belt 25, are effectively kneaded. During the kneading action, the chamber drum 22 is gradually rotated in the direction of rotation 54. After kneading, the kneaded dough pieces 12 leave the kneading drum 20 via the discharge conveying part 30 of the kneading belt 25 and the dough discharge device 31.

The lift adjustment device 35 is not only applicable for providing an optimum relative position of the portioning chamber 13 relative to the associated kneading chamber 21 but also for actively transferring the dough piece 12. This will hereinafter be explained in more detail by means of FIG. 7. Components which correspond to those discussed above with reference to FIGS. 1 to 6 have the same reference numerals and are not explained in detail again.

Figure 7:
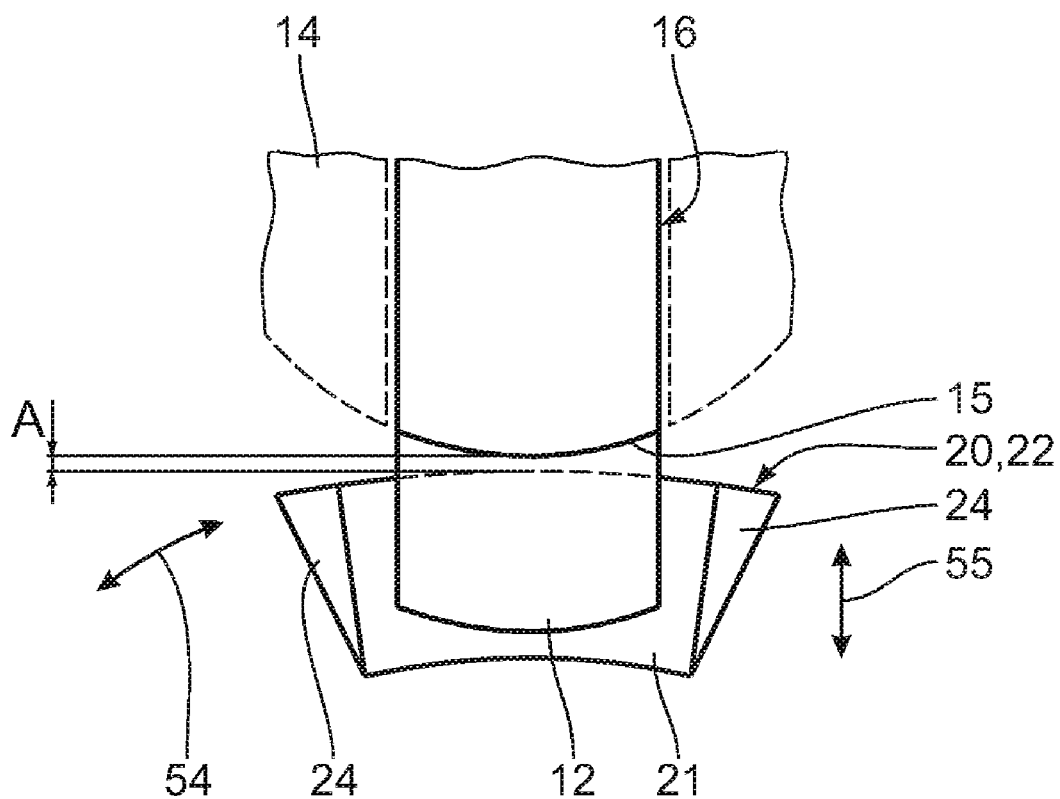
FIG. 7 shows a schematic and enlarged view of an output end of a discharge piston together with a dough portion while the dough portion is transferred to a kneading cell of the dough kneading device.

In the embodiment according to FIG. 7, the lift adjustment device 35 performs a lifting movement along a lifting direction 55 during each transfer of a dough piece 12 from the portioning chamber 13 to the associated kneading chamber 21.

FIG. 7 shows the case in which the discharge piston 16 has discharged the dough piece 12 from the rotary vane 14. The dough piece 12 still adheres to the discharge wall 15 of the discharge piston 16. By means of the lift adjustment device 35, the distance A between the rotary vane 14 and the kneading drum 20 is reduced to such an extent that in this discharge position, the dough piece 12 protrudes into the associated kneading chamber 21. In order to transfer the dough piece 12 to the kneading chamber 21, the rotary drive of the chamber drum 22 may now be actuated in the direction of rotation 54 (or in the opposite direction) so that the kneading-cell boundary web 24 comes into contact with the dough piece 12 and detaches the dough piece 12 from the discharge wall 15, wherein the dough piece 12 safely falls into the associated kneading chamber 21 upon detachment from the discharge piston 16.

In this way, a synchronized relative movement of the kneading drum 20 relative to the movements of the rotary vane 14 and the discharge piston 16 ensures a controlled transfer of the dough piece 12 from the portioning chamber 13 to the kneading chamber 21. This synchronized relative movement may be achieved by intermittently actuating the lift adjustment device 35 in particular synchronously with the movements of the delivery piston 8 and the rotary vane 14.

In an embodiment of the dough processing machine 1 which is not shown here, the linear guide means 45, 46 additionally comprise a locking device for locking the kneading drum 20 in the respective lifting position. The locking device may prevent a negative influence of vibrations of the kneading drum 20 on the linear guide means 45, 46.

As an alternative or in addition to a vertical lift adjustment of the kneading drum 20, a corresponding vertical lift adjustment of the rotary vane 14 is conceivable as well. To this end, the rotary vane 14 may be equipped with a lift adjustment device which may be actuated by a motor, the lift adjustment device corresponding to the lift adjustment device 35 described above in relation to the kneading drum 20.

What is claimed is:

1. A dough processing machine (1) comprising
   a support frame (4);
   a dough feed device (3, 8);
   a dough portioning device;
   a dough kneading device (20);
   a dough transfer device which transfers at least one dough portion (12) from at least one portioning chamber (13) of the dough portioning device (14, 16) to at least one kneading chamber (21) of the dough kneading device (20) during transfer time periods,
   wherein the dough transfer device is designed such that in a transfer position of the portioning chamber (13), the dough portion (12) detaches from a discharge piston (16) and falls into the associated kneading chamber (21),
   wherein an adjustment device (35) is provided for defining a vertical distance (A) between the transfer device (14, 16) and the kneading chamber (21).

2. A dough processing machine according to claim 1, wherein the adjustment device (35) is designed such as to allow a horizontal distance to be defined between the transfer device (14, 16) and the kneading chamber (21) as well.

3. A dough processing machine according to claim 1, wherein the adjustment device (35) comprises a displacement drive (41; 42) for displacement of the dough kneading device (20) with a vertical directional component.

4. A dough processing machine according to claim 1, wherein the adjustment device (35) comprises a displacement drive for displacement of the dough portioning device (14, 16) with a vertical directional component.

5. A dough processing machine according to claim 4, wherein the adjustment device (35) is connected to a drive motor (42) which is in a signal connection with a control unit (44).

6. A dough processing machine according to claim 5, wherein the control unit (44) is in a signal connection with a drive component (26) of a drive of the dough kneading device (20).

7. A dough processing machine according to claim 3, wherein the displacement drive comprises at least one spindle-type lifting gear (36).

8. A dough processing machine according to claim 1, wherein the adjustment device (35) comprises a guide means (45, 46) for guiding a displacement movement of at least one of the group comprising the dough kneading device (20) and the dough portioning device (14, 16) relative to the support frame (4).

9. A dough processing machine according to claim 1, wherein the dough kneading device (20) is a kneading drum.

10. A dough processing machine according to claim 9, wherein the guide means (45, 46) is on both sides mounted on stub axles of the kneading drum (20).

11. A dough processing machine according to claim 10, wherein one of the spindly-type lifting gears (36) is assigned to each partial guide means (45, 46) which is in each case assigned to one stub axle.

12. A dough processing machine according to claim 10, wherein the guide means comprises two linear guides (45, 46)

which are assigned to the two stub axles of the kneading drum (20).

13. A dough processing machine according to claim 12, wherein the linear guides (45, 46) are designed as recirculating ball bearing guides.

14. A dough processing machine according to claim 1, wherein the adjustment device (35) is designed such that when at least one of group comprising the dough kneading device (20) and the dough portioning device (14, 16) is displaced, at least a drive component of the displaced component (20; 14, 16) remains in place.

15. A dough processing machine according to claim 14, wherein a drive component (29) for the dough kneading device (20) is a belt drive with a belt-length compensation device (53).

\* \* \* \* \*